(12) United States Patent
Klawitter et al.

(10) Patent No.: US 12,552,337 B2
(45) Date of Patent: Feb. 17, 2026

(54) DISCONNECTING DEVICE AND POWER SUPPLY NETWORK FOR A MOTOR VEHICLE

(71) Applicant: Bayerische Motoren Werke Aktiengesellschaft, Munich (DE)

(72) Inventors: Thomas Klawitter, Munich (DE); Christoph Weissinger, Schliersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 179 days.

(21) Appl. No.: 17/917,074

(22) PCT Filed: Mar. 2, 2021

(86) PCT No.: PCT/EP2021/055160
§ 371 (c)(1),
(2) Date: Oct. 5, 2022

(87) PCT Pub. No.: WO2021/213716
PCT Pub. Date: Oct. 28, 2021

(65) Prior Publication Data
US 2023/0141892 A1    May 11, 2023

(30) Foreign Application Priority Data

Apr. 24, 2020   (DE) ............... 10 2020 111 266.1

(51) Int. Cl.
*B60R 16/033*   (2006.01)
*G01R 31/00*    (2006.01)
(Continued)

(52) U.S. Cl.
CPC .......... *B60R 16/033* (2013.01); *G01R 31/006* (2013.01); *G01R 31/52* (2020.01); *H02H 3/24* (2013.01); *H02H 3/36* (2013.01)

(58) Field of Classification Search
CPC .... B60R 16/033; G01R 31/52; G01R 31/006; H02H 3/24; H02H 3/36
(Continued)

(56) References Cited

U.S. PATENT DOCUMENTS 3,809,990 A *   5/1974   Kuo .................. H02K 37/00
                                                     318/696
2006/0208491 A1*   9/2006   Wolf ................... H02J 7/1423
                                                     290/1 R
(Continued)

FOREIGN PATENT DOCUMENTS

CA    2 308 273 A1    5/1999
CN    1277748 A       12/2000
(Continued)

OTHER PUBLICATIONS

Machine translation DE102018210943A1.*
(Continued)

*Primary Examiner* — Kawing Chan
(74) *Attorney, Agent, or Firm* — Crowell & Moring LLP

(57) ABSTRACT

A disconnecting device for a power supply network of a motor vehicle is provided. The power supply network has a first sub-network and a second sub-network. The disconnecting device includes a switching element for switchably coupling the first sub-network to the second sub-network. The disconnecting device also includes a control unit, which is configured to control at least one state variable of the power supply network by actuating the switching element.

13 Claims, 2 Drawing Sheets

(51) Int. Cl.
  *G01R 31/52* (2020.01)
  *H02H 3/24* (2006.01)
  *H02H 3/36* (2006.01)
(58) Field of Classification Search
  USPC .......................................................... 361/21
  See application file for complete search history.

(56) References Cited

U.S. PATENT DOCUMENTS

| | | | | |
|---|---|---|---|---|
| 2009/0015973 | A1* | 1/2009 | Trunk | B60L 3/0069 |
| | | | | 361/42 |
| 2014/0117925 | A1 | 5/2014 | Pischke et al. | |
| 2014/0306521 | A1* | 10/2014 | Eschenhagen | B60L 58/20 |
| | | | | 307/10.1 |
| 2014/0354040 | A1* | 12/2014 | Reichow | B60R 16/03 |
| | | | | 307/9.1 |
| 2016/0156179 | A1 | 6/2016 | Walter | |
| 2019/0036330 | A1* | 1/2019 | Becker | H02H 9/008 |
| 2019/0123545 | A1 | 4/2019 | Maekawa et al. | |
| 2022/0348156 | A1* | 11/2022 | Kahnt | B60R 16/033 |

FOREIGN PATENT DOCUMENTS

| | | | | |
|---|---|---|---|---|
| CN | 103620901 A | | 3/2014 | |
| CN | 108886248 A | | 11/2018 | |
| DE | 102012200823 A1 * | | 7/2013 | ............. B60R 16/03 |
| DE | 10 2014 200 379 A1 | | 7/2015 | |
| DE | 10 2014 221 281 A1 | | 4/2016 | |
| DE | 10 2017 213 017 A1 | | 7/2018 | |
| DE | 10 2017 213 409 A1 | | 2/2019 | |
| DE | 102018210943 A1 * | | 1/2020 | ............. B60R 16/03 |
| DE | 10 2019 214 674 A1 | | 12/2020 | |
| JP | 2008-72880 A | | 3/2008 | |
| WO | WO 2015/014551 A1 | | 2/2015 | |

OTHER PUBLICATIONS

International Search Report (PCT/ISA/210) issued in PCT Application No. PCT/EP2021/055160 dated May 14, 2021 with English translation (five (5) pages).

German-language Written Opinion (PCT/ISA/237) issued in PCT Application No. PCT/EP2021/055160 dated May 14, 2021 (nine (9) pages).

German-language Search Report issued in German Application No. 10 2020 111 266.1 dated Jan. 5, 2021 with partial English translation (11 pages).

Chinese-language Office Action issued in Chinese Application No. 202180028049.6 dated Mar. 20, 2025 with English translation (21 pages).

Chinese-language Office Action issued in Chinese Application No. 202180028049.6 dated Sep. 29, 2025 with English translation (18 pages).

* cited by examiner

DISCONNECTING DEVICE AND POWER SUPPLY NETWORK FOR A MOTOR VEHICLE

BACKGROUND AND SUMMARY OF THE INVENTION

The present invention relates to a disconnecting device for an energy supply system of a motor vehicle, wherein the energy supply system has a first subsystem and a second subsystem and the disconnecting device has a switching element in order to couple the first subsystem to the second subsystem in a switchable manner. The invention furthermore relates to an energy supply system for a motor vehicle and to a method for operating an energy supply system for a motor vehicle.

Safety-relevant vehicle functions in motor vehicles, such as for instance steering functions, braking functions, lighting functions or wiper functions, generally require a supply of electrical energy in order to make the driving situations sufficiently manageable for the driver. This results in requirements on the energy supply in terms of being sufficiently reliable. In the case of a fault occurring in the energy supply system, the safety-relevant consumers should in particular continue to be supplied with energy.

One possible technical implementation is that of designing the energy supply redundantly using two energy supply subsystems or on-board power systems. In this case, safety-relevant consumers and other consumers, for example comfort consumers, may be arranged in different subsystems. The subsystems may be separated from one another by a disconnecting device, such that the faulty subsystem is able to be disconnected reliably from the remaining subsystem in the sense of protecting the line.

By way of example, document DE 10 2014 221 281 A1 describes a vehicle on-board power system with high availability. The vehicle on-board power system has a first subsystem and a second subsystem and a decoupling element that, during normal operation of the on-board power system, conductively connects the subsystems to one another and, in the event of a fault in one of the subsystems, blocks a flow of energy between the two subsystems and accordingly disconnects the subsystems from one another. For this purpose, the decoupling element has a switching element that is conductive during normal operation and blocking in the presence of the fault.

One disadvantage of such an on-board power system is that a short circuit in a consumer of one of the subsystems leads to a voltage dip in this subsystem. Since, in this case, the switching element disconnects the two subsystems from one another, fault-free further consumers in the subsystem containing the faulty consumer may possibly also no longer be supplied with enough energy. The voltage dip may in particular result in a fuse device for disconnecting or separating the faulty consumer, for example a safety fuse, not being able to trip within a short time, since the voltage level in the faulty subsystem has collapsed and no energy is able to be delivered from the other subsystem. This accordingly leads to restricted availability of the faulty subsystem, and thus also of the entire on-board power system.

Against this background, one object of the present invention is to specify an improved concept for a disconnecting device for an energy supply system of a motor vehicle, by way of which the availability of the energy supply system is able to be further increased.

This object is achieved here by the claimed invention.

The improved concept is based on the idea of not permanently disconnecting the two subsystems from one another in the event of a fault with one of the subsystems, but rather instead of regulating at least one state variable of the energy supply system.

According to the improved concept, a disconnecting device for an energy supply system of a motor vehicle is specified. The energy supply system in this case has a first subsystem and a second subsystem. The disconnecting device has a switching element in order to couple, in particular to electrically connect, the first subsystem to the second subsystem in a switchable manner. The disconnecting device has a regulation unit that is configured to regulate at least one state variable of the energy supply system by driving the switching element.

Here and in the following text, a subsystem may be understood to mean an energy supply subsystem.

The fact that the switching element is able to couple the first and the second subsystem to one another in a switchable manner may be understood to mean that the electrical connection between the subsystems is able to be established and interrupted selectively by the switching element.

The switching element may in this case in particular contain a semiconductor switching element, for example a power semiconductor switching element, in particular a power transistor. By way of example, the switching element may contain a field-effect transistor, FET, in particular a MOSFET, or an insulated-gate bipolar transistor, IGBT.

The switching element may in particular have a first terminal for connecting the switching element to the first subsystem and a second terminal for connecting the switching element to the second subsystem. The switching element may additionally have a control terminal, for example a gate terminal, for receiving a control signal, for example a gate voltage. The control terminal may in this case in particular be connected to the regulation unit.

Driving the switching element by way of the regulation unit involves in particular generating, providing and/or changing the control signal at the control terminal of the switching element. The regulation unit is in particular configured, in order to regulate the at least one state variable, to generate the control signal, in particular to generate it in a time-dependent manner, such that a conductivity of the switching element, in particular between the first and the second terminal of the switching element, is changed in accordance with the regulation.

By way of example, the switching element, at corresponding values of the control signal, may be switched into a conducting, that is to say closed, state or into a non-conducting, that is to say open, state. The switching element may thus be operated in particular in a saturation region such that a conductivity of the switching element between the first and the second terminal is able to be switched between two approximately constant values by changing the control signal.

The regulation unit may for example contain one or more sensor elements for acquiring the at least one state variable as regulation variable of the regulation. By way of example, the regulation unit may also contain a regulator that is configured, based on the acquired at least one regulation variable, to determine a value for the control signal and to generate the control signal accordingly.

The regulation unit may be designed for example as a digital regulation unit.

The at least one state variable may also be understood as a state vector containing at least one state variable. If the state vector contains more than one state variable, the regulation unit may for example be configured to regulate the state variables through cascade regulation.

In particular in the fault-free operating state of the energy supply system, in particular of both subsystems, a flow of energy between the two subsystems is possible, in particular from the first subsystem to the second subsystem. A corresponding transfer current is thus able to flow from one to the other subsystem through the disconnecting device.

Depending on the voltage ratios in the two subsystems, in particular including in the event of a faulty operating state of the energy supply system, that is to say in the case of a fault in the first or second subsystem, a flow of energy from the second to the first subsystem may be possible.

The first subsystem may for example have a first consumer and a first energy source for supplying energy to the first consumer. The first subsystem may furthermore have an electrical or electronic fuse, for example a safety fuse, which couples, in particular conductively connects, the first consumer to the first energy source.

The second subsystem may for example have a second consumer and a second energy source for supplying energy to the second consumer.

By virtue of the coupling of the subsystems by way of the disconnecting device, the first energy source, in particular in the fault-free operating state, is however also able to provide energy to the second subsystem, in particular to the second consumer and/or the second energy source.

Likewise, in particular in the event of a fault in the first subsystem, the second energy source is able to provide energy to the first subsystem, in particular a further first consumer of the first subsystem and/or the fuse.

By virtue of regulating the at least one state variable, in particular in a faulty operating state of the energy supply system, in particular of the first subsystem, it is possible not to permanently disconnect the two subsystems from one another even in the event of a fault, and still to limit the flow of energy from the faulty subsystem to the fault-free subsystem.

The faulty subsystem, for example the first subsystem, may additionally be supplied with electrical energy by the fault-free subsystem, for example the second subsystem. The fuse in the first subsystem may thereby be supplied with enough energy. If for example there is a fault with the first consumer, then the provided energy, that is to say the first consumer, may be disconnected quickly from the first subsystem by tripping the fuse. Even faulty further first consumers in the first subsystem may thereby be supplied with energy again quickly.

On the one hand, this guarantees line protection, with the second, fault-free subsystem in particular being protected, and, on the other hand, the availability of the further first consumers in the first subsystem is increased through the regulation.

The availability of the overall energy supply system is thereby further increased as a whole.

According to at least one embodiment of the disconnecting device, the regulation unit is configured to regulate the at least one state variable during faulty operation of the energy supply system, in particular of the first subsystem, in particular when there is a fault with the first consumer or a circuit branch of the first subsystem that contains the first consumer.

According to at least one embodiment, the disconnecting device contains an inductive component that is arranged between the switching element and one of the subsystems, that is to say between the switching element and the first subsystem or between the switching element and the second subsystem.

In other words, the switching element may thus electrically conductively connect the first subsystem and the second subsystem to one another, that is to say via the inductive component.

The inductive component may be for example part of an electrical line having a corresponding line inductance, or a dedicated inductive component, for example a choke.

By way of example, the first subsystem may have a first output in order to connect the first subsystem to the disconnecting device and the second subsystem may have a second output in order to connect the second subsystem to the disconnecting device. In particular, the first energy source may have an output that is connected to the first output and the second energy source may have an output that is connected to the second output of the second subsystem.

The fact that the inductive component is arranged between the switching element and one of the subsystems may therefore be understood in particular to mean that a first terminal of the inductive component is connected to the first terminal of the switching element and a second terminal of the inductive component is connected to the first output of the first subsystem. As an alternative, the first terminal of the inductive component may be connected to the second terminal of the switching element and the second terminal of the inductive component may be connected to the second output of the second subsystem.

By virtue of the inductive component and the specific arrangement between the switching element and the corresponding subsystem, a flow of energy, in particular a current strength, between the first and the second subsystem may be limited in the faulty operating state. This makes it possible in particular to prevent failure of safety-relevant consumers in the second subsystem if a fault occurs in the first subsystem. The regulating device allows operation of both subsystems even in the event of a fault.

According to at least one embodiment, the disconnecting device contains a freewheeling component that is arranged in parallel with the inductive component or is arranged between the inductive component and a constant reference potential. The reference potential may for example correspond to a ground terminal.

The freewheeling component may accordingly thus have a first terminal that is connected to the first terminal of the inductive component and a second terminal that is connected to the second terminal of the inductive component.

As an alternative, the first or the second terminal of the freewheeling component may be connected to the reference potential.

The freewheeling component may for example contain a diode.

The freewheeling component may for example contain a resistor, in particular an ohmic resistor, in particular a resistive component, which is connected in series with the diode.

By virtue of the freewheeling component, the voltage that is dropped across the inductive component during switching of the inductive component is able to be limited. Overvoltages in the subsystems may thus be avoided.

According to at least one embodiment, the regulation unit is configured to drive the switching element, during a fault-free operating state of the energy supply system, in particular of the first subsystem, such that the switching element is permanently closed during the fault-free operating state.

In other words, the switching element is permanently in the electrically conducting state during the fault-free operating state.

A flow of energy between the subsystems is thereby enabled during the fault-free operating state.

In particular, one or more regulation target variables, regulation target limit values or regulation target ranges may be refined or selected accordingly such that the switching element is able to remain permanently closed during the fault-free operating state.

The regulation may for example in particular be made with respect to one or more target ranges that are open on one side.

In addition, for example in comparison with dynamic regulation of the switching element, it is possible to save energy even during the fault-free operating state.

According to at least one embodiment, the regulation unit is configured to drive the switching element, during a faulty operating state of the energy supply system, in particular of the first subsystem, such that it is not permanently closed.

In other words, the switching element is repeatedly opened and closed during the faulty operating state in order to regulate the at least one state variable.

According to at least one embodiment, the regulation unit is configured to generate the control signal for driving the switching element in the faulty operating state of the first subsystem in a modulated manner in order to regulate the at least one state variable.

In this case, the faulty operating state of the first subsystem corresponds in particular to a fault with the first consumer or with a circuit branch of the first subsystem that contains the first consumer. This may result in an increased flow of current due to a fault current or short circuit in the corresponding circuit branch of the first subsystem. The voltage in the second subsystem may accordingly also drop, in particular at the second consumer.

The situation whereby the control signal is generated in a modulated manner, that is to say changes its value in a time-dependent manner, is achieved in particular in that the switching state of the switching element changes between conducting and non-conducting or between closed and open in a time-dependent manner.

This achieves more accurate, reliable and fast regulation of the at least one state variable.

The regulation unit may in particular be configured to generate the control signal during the faulty operating state through pulse width modulation.

According to at least one embodiment, the at least one state variable contains a voltage that is present at the second subsystem, in particular at the second consumer of the second subsystem.

As a result of a fault in the first subsystem and a corresponding fault current in the first subsystem, energy would for example be transferred, by the second energy source of the second subsystem, from the second subsystem to the first subsystem, such that the voltage at the second consumer would drop without appropriate regulation.

By virtue of such embodiments, the second subsystem, in particular the second consumer, is thus protected against any undervoltage, that is to say an excessively low voltage supply, such that the availability of the second subsystem is able to be increased.

According to at least one embodiment, a regulation target value for the voltage or a regulation limit value for the voltage is greater than or equal to a predefined permissible minimum voltage for the second consumer.

Here and in the following text, the voltage is understood to mean an absolute value of the voltage, unless expressly indicated otherwise.

The voltage at the second consumer may for example also be regulated indirectly by regulating an output voltage of the second energy source.

During fault-free operation of both energy systems, the voltage at the second consumer is in particular also, without any modulation of the conductivity of the switching element, greater than the predefined minimum voltage or the regulation target or limit value, such that the regulation unit is able to permanently close the switching element in this case.

In the faulty operating state, in particular of the first subsystem, there may be a correspondingly high fault current in the first subsystem, such that the voltage, as described, may also drop in the second subsystem. The regulation then keeps the voltage at the second consumer higher than the regulation limit value or regulates the voltage to the regulation target value.

In embodiments in which the regulation target value is greater than or equal to the minimum voltage for the second consumer, the regulation is performed in particular with respect to the regulation target value, possibly with an appropriate tolerance.

In embodiments in which the regulation limit value for the voltages in the second consumer is greater than or equal to the minimum voltage, the regulation is performed in particular with respect to a target range, wherein the target range may in particular be open on one side. The regulation limit value then corresponds in particular to a minimum limit value of the target range.

In such embodiments, it may thus be ensured that the predefined minimum voltage for the second consumer is not dropped below, such that the availability thereof is ensured.

According to at least one embodiment, the at least one state variable contains an electric current strength of a transfer current from the second subsystem to the first subsystem, in particular during the faulty operating state of the first subsystem.

The transfer current in this case flows in particular through the switching element and possibly through the inductive component.

Without the regulation in accordance with the improved concept, the second subsystem would not be able to deliver any energy to the first subsystem in the form of the transfer current, since the subsystems would be permanently disconnected from one another in the faulty operating state.

By virtue of the regulation, enough energy is thus able to be transferred from the second subsystem to the first subsystem, such that the fuse of the first consumer is able to trip as quickly as possible.

This increases the availability of the further first consumers in the first subsystem.

According to at least one embodiment, a regulation target value for the current strength or a regulation limit value for the current strength is less than or equal to a predefined maximum switchable current strength of the switching element.

During fault-free operation, the current strength is for example, without any moderation of the conductivity of the switching element, less than the maximum switchable current, such that the switching element is able to be closed, in particular permanently.

During faulty operation, the regulation then for example ensures that enough energy is able to be transferred from the second subsystem to the first subsystem.

According to the improved concept, an energy supply system for a motor vehicle is also specified. The energy supply system has a first subsystem containing a first consumer, and containing a first energy source for supplying energy to the first consumer. The first subsystem furthermore has a fuse device, in particular an electrical or electronic fuse, which couples, in particular electrically conductively connects, the first consumer to the first energy source. The energy supply system has a second subsystem containing a second consumer and a second energy source for supplying energy to the second consumer. The energy supply system has a disconnecting device according to the improved concept, wherein the first subsystem is coupled, in particular electrically conductively connected, to the second subsystem in a switchable manner by the disconnecting element.

A first terminal of the first consumer is connected in particular directly or indirectly to the first output of the first subsystem and a second terminal of the first consumer is connected in particular directly or indirectly to the reference potential.

A first terminal of the second consumer is connected in particular directly or indirectly to the second output of the second subsystem and a second terminal of the second consumer is connected in particular directly or indirectly to the reference potential.

The fuse device may also be referred to as overcurrent protection device and may in particular be in the form of a safety fuse.

The improved concept is particularly advantageous in particular in such embodiments since, as described above with regard to the disconnecting device, high current is able to be provided from the second subsystem to the first subsystem quickly enough even in the event of a fault with the first subsystem, such that the safety fuse is able to trip quickly and reliably separate the faulty first consumer.

According to at least one embodiment of the energy supply system, the first energy source contains an electrical generator and/or a first electrical energy storage unit.

The first electrical energy storage unit may in this case be designed as a battery or rechargeable battery.

According to at least one embodiment, the first energy source contains a power converter, in particular a rectifier.

The power converter may in particular be arranged between the generator and the first electrical energy storage unit and/or between the generator and the first output of the first subsystem in order to convert AC voltage generated by way of the electrical generator into DC voltage.

According to at least one embodiment, the second energy source contains a second electrical energy storage unit, which is designed in particular as a battery or rechargeable battery.

According to at least one embodiment, the first subsystem contains at least one further first consumer that is arranged in parallel with the first consumer.

A first terminal of the at least one further first consumer is connected in particular directly or indirectly to the first output of the first subsystem and a second terminal of the at least one further first consumer is connected in particular directly or indirectly to the reference potential.

According to at least one embodiment, the second subsystem contains at least one further second consumer that is arranged in parallel with the second consumer.

A first terminal of the at least one further second consumer is connected in particular directly or indirectly to the second output of the second subsystem and a second terminal of the at least one further second consumer is connected in particular directly or indirectly to the reference potential.

According to at least one embodiment, the first consumer, and in particular the at least one first further consumer, in particular all consumers of the first subsystem, are designed in accordance with a first ASIL classification level and the second consumer, and in particular the at least one first further second consumer, for example all consumers of the second subsystem, are designed in accordance with a second ASIL classification level. The second ASIL classification level is in this case higher than the first ASIL classification level.

The ASIL classification levels may be understood to mean in particular levels in accordance with the ISO 26262 industrial standard in the version valid on Jan. 4, 2020.

The ASIL classification levels comprise for example a classification level QM, a classification level ASIL-A, a classification level ASIL-B, a classification level ASIL-C and/or a classification level ASIL-D.

The classification level ASIL-D in this case corresponds to the highest ASIL classification level and the classification level QM corresponds to the lowest classification level.

According to at least one embodiment, the first consumer is designed in accordance with the classification level QM and the second consumer is designed in accordance with the classification level ASIL-B or higher.

In such embodiments, all safety-relevant consumers, for example those consumers that have a relatively high safety relevance, are arranged in the second subsystem, while less safety-relevant or non-safety-relevant consumers, for example comfort consumers, are arranged in the first subsystem.

The availability of the safety-relevant consumers in the event of a fault, in particular in the case of a faulty operating state of the first subsystem, may thereby be ensured, on the one hand, by regulating the at least one state variable, that is to say in particular by limiting an energy transfer between the subsystems through the regulation. On the other hand, the regulation however also ensures the availability of those non-safety-relevant consumers that are not faulty. This firstly increases the overall availability of the energy supply system and also ensures a degree of comfort for a user of the motor vehicle.

According to the improved concept, a motor vehicle having an energy supply system is also specified.

According to the improved concept, a method for operating an energy supply system for a motor vehicle or a motor vehicle is also specified. The energy supply system in this case has a first subsystem and a second subsystem that is coupled to the first subsystem in a switchable manner by a disconnecting element. At least one state variable of the energy supply system is regulated by driving the switching element, in particular by way of a regulation unit of the energy supply system.

Further embodiments of the method for operating the energy supply system emerge directly from the various embodiments of the disconnecting device according to the improved concept and the energy supply system according to the improved concept, and vice versa in each case.

A disconnecting device according to the improved concept may in particular be configured to perform a method according to the improved concept, or it performs such a method. An energy supply system according to the improved concept may in particular be configured to perform a method according to the improved concept, and it performs such a method.

Further features of the invention will become apparent from the claims, the figures and the description of the figures. The features and combinations of features mentioned above in the description and the features and combinations of features mentioned below in the description of the figures and/or shown on their own in the figures may be used not only in the respectively specified combination but also in other combinations or on their own.

The invention is now explained in more detail on the basis of one exemplary embodiment and with reference to the drawings.

DETAILED DESCRIPTION OF THE DRAWINGS

Figure 1:
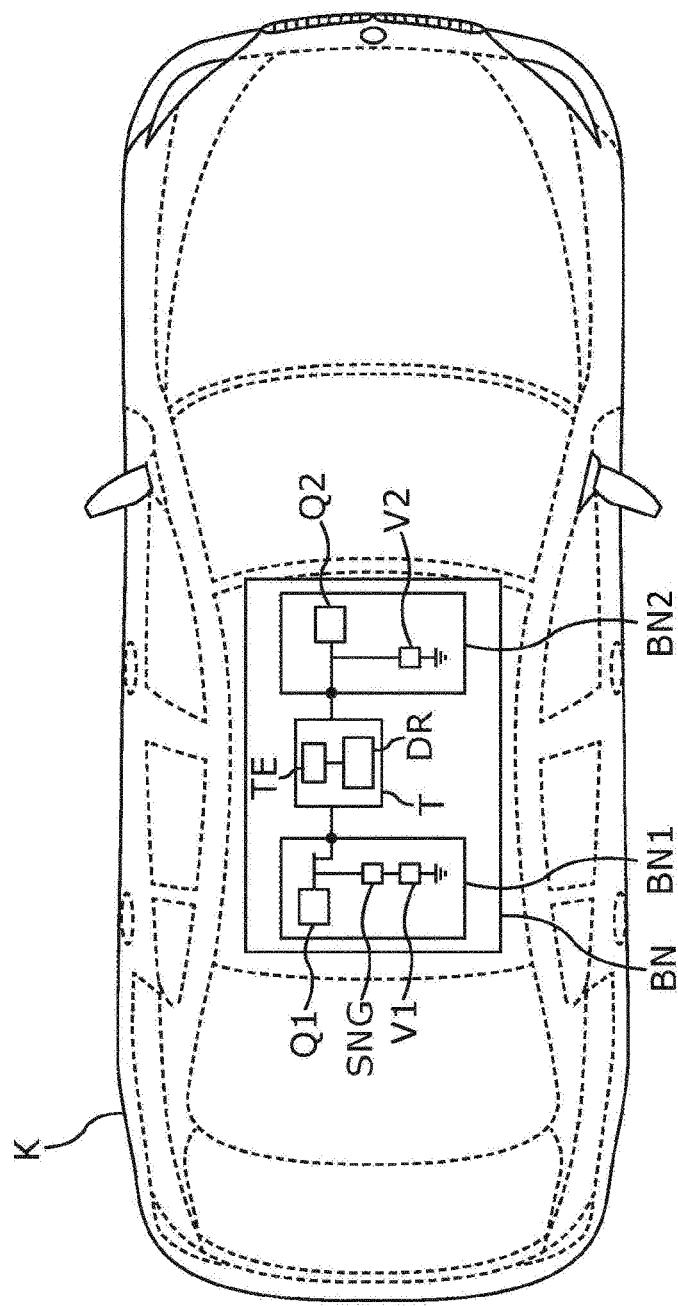
FIG. 1 shows a schematic illustration of a motor vehicle having an exemplary embodiment of an energy supply system according to the improved concept.

FIG. 1 shows a motor vehicle K that has an energy supply system BN according to the improved concept.

The energy supply system BN has a first subsystem BN1 and a second subsystem BN2 and a disconnecting device T, which couples the subsystems BN1, BN2 to one another.

The first subsystem BN1 has a first energy source Q1, which is connected to the disconnecting device T, and a first consumer V1, which is connected between the output of the first energy source Q1 and a reference potential, in particular a ground terminal. In this case, a fuse SNG, for example a safety fuse, is in particular arranged between the first consumer V1 and the first energy source Q1.

The second subsystem BN2 has a second energy source Q2, which is connected to the disconnecting device T, and a second consumer V2, which is arranged between the reference potential and an output of the second energy source Q2.

The disconnecting device T has a switching element TE that is coupled to the subsystem BN1, BN2 such that the switching element TE electrically conductively connects the subsystems BN1, BN2 to one another in the closed state and disconnects the subsystems BN1, BN2 from one another in the open state or opened state.

The switching element TE in particular has a first terminal, which is connected to the first subsystem BN1, and a second terminal, which is connected to the second subsystem BN2.

The switching element TE may be designed for example as a transistor, for example as an IGBT or FET, for example MOSFET. The first terminal and the second terminal of the switching element TE then correspond for example to a collector terminal and an emitter terminal of the switching element TE or vice versa, or to a source terminal and a drain terminal of the switching element TE or vice versa. The switching element TE furthermore has a control terminal, for example a gate electrode.

The disconnecting device T furthermore contains a regulation unit DR, which is connected to the switching element TE, in particular the control terminal. The regulation unit DR may in particular provide a control signal, in particular a gate voltage, at the control terminal, in order to open or to close the switching element TE, that is to say to switch it into the open state or into the closed state.

The regulation unit DR is in this case configured to drive the switching element TE, by providing the control signal, such that at least one state variable of the energy supply system BN is regulated.

Figure 2:
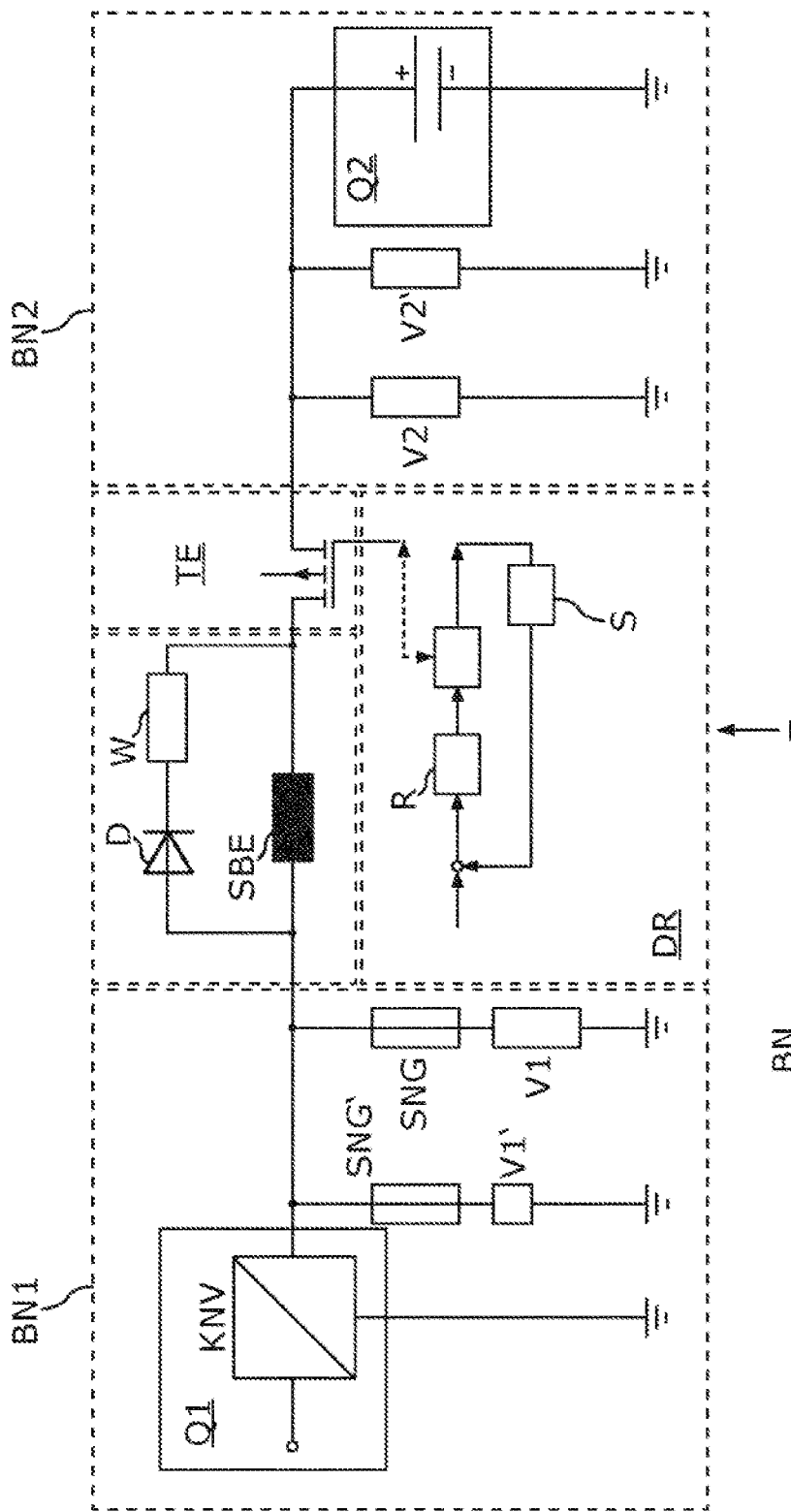
FIG. 2 shows a schematic illustration of a further exemplary embodiment of an energy supply system according to the improved concept.

FIG. 2 illustrates a further exemplary embodiment of the energy supply system BN according to the improved concept, wherein the energy supply system BN of FIG. 1 may for example be designed in accordance with the energy supply system BN of FIG. 2. The energy supply system BN of FIG. 2 is in particular based on the energy supply system BN of FIG. 1, and so only differences or special features are discussed below.

In the embodiment of the energy supply system BN according to FIG. 2, the disconnecting device T has a transistor, for example a FET as switching element TE, the gate electrode of which is connected to the regulation unit DR. The disconnecting device T furthermore has an inductive component SBE, which may be designed for example as a choke or as a line inductance. The inductive component SBE is connected in series with the switching element TE, in particular connected in series between the outputs of the first and the second subsystem BN1, BN2.

The disconnecting device T furthermore contains a freewheeling path containing a freewheeling diode D and a series resistor W, which is connected in series with the freewheeling diode D. The freewheeling path, in particular the series connection of the freewheeling diode D and the series resistor W, is connected in parallel with the inductive component SBE.

In alternative embodiments, the freewheeling path may also be arranged between a terminal of the inductive component SBE and the reference potential.

The regulation unit DR has for example a regulator R, and a sensor device S. The sensor device S may acquire or measure the at least one state variable of the energy supply system BN and the regulator R may determine a value for the control signal based on the measured at least one state variable and provide it to the control electrode of the switching element TE.

The first energy source Q1 may for example contain a first battery (not shown) and a generator (not shown). The first energy source Q1 may also have a power converter KNV, which is configured and arranged to convert an output voltage of the generator into a DC voltage and for example to provide it to the first consumer V1 and/or the first battery. The second energy source Q2 in particular contains a second battery.

By way of example, the first subsystem BN1 may have a further first consumer V1' and a further fuse SNG'. The further first consumer V1' and the further fuse SNG' are for example connected in series and arranged between the reference potential and the output of the first subsystem BN1.

By way of example, the second subsystem BN2 may have a further second consumer V2' that is arranged between the reference potential and the output of the second subsystem BN2.

The second consumers V2, V2' may be for example safety-relevant consumers and the second energy source Q2 may be a reliable energy source. The second consumers V2, V2' and/or the second energy source Q2 may be designed for example in accordance with ASIL-B.

The first consumers V1, V1' may be designed for example in accordance with the ASIL classification level QM and be supplied with energy by the first energy source Q1.

During normal operation or fault-free operation of the energy supply system BN, the switching element TE is closed, in particular in a manner driven by the regulation unit DR. The second energy source Q2 may thus in particular be supplied with energy by the first energy source Q1.

If the second subsystem BN2 is also not operating correctly, for example due to diagnostic slip of the second energy source Q2, the safety-relevant consumers V2, V2' may also be supplied with energy by the first energy source Q1.

In the event of a fault, for example a short circuit, in the first subsystem BN1, in particular the first consumer V1, it is desirable to separate the faulty consumer V1 as quickly as possible by tripping the fuse SNG. For this purpose, it is in particular necessary for the fuse SNG, which is designed for example as a safety fuse, to be provided with enough energy to trip.

In this case, the regulation of the at least one state variable by the regulation unit DR ensures that the disconnecting device T does not completely separate the two subsystems BN1, BN2 from one another, but rather implements a current-limiting function that maintains the connection of the two subsystems BN1, BN2 via an inductive component SBE as current-limiting element.

In the event of a fault, regulated operation may thereby be achieved by regulating with respect to the at least one state variable.

The regulation may in this case be carried out based on methods that are known per se. By way of example, cascade regulation may be used, this comprising current regulation for the first subsystem BN1 and subordinate voltage regulation for the second subsystem BN2.

As a result, for example, in the event of a fault, the maximum fault current for the first subsystem BN1 is able to be delivered from the second energy source Q2 of the second subsystem BN2 in order to trip the fuse SNG in the faulty branch as quickly as possible. The maximum fault current may in this case always be set below the switching limits, that is to say the maximum switchable current, of the switching element TE, this resulting from the dimensioning of the switching element TE.

The subordinate voltage regulation in the second subsystem BN2 is used for example to protect the safety-relevant consumers V2, V2' against an undervoltage that could lead to the failure of the corresponding safety-relevant consumers V2, V2'. A target value specification for the voltage regulation may accordingly correspond to a minimum permissible voltage at the safety-relevant consumers V2, V2'.

The voltage regulation may possibly also be regulated indirectly via the output voltage of the second energy source Q2.

In the event of a fault, for example a short circuit, at the non-safety-relevant first consumer V1, a fault current or short-circuit current may arise that is so high that the voltage at the safety-relevant consumers V2, V2' would drop without the regulation so greatly that the safety-relevant consumers V2, V2' would no longer be able to reliably carry out their identified safety functions. This state is avoided by the disconnecting device T by virtue of this being clocked, for example in the microsecond range, separating and reconnecting the subsystems BN1, BN2 from and to one another by virtue of driving the switching element TE for example through pulse width modulation.

In the event of a fault, without the regulation of the at least one state variable, the voltage in the first subsystem BN1 would however also drop so greatly that the first energy source Q1 would no longer be able to trip the fuse SNG. In this case, important or comfort-relevant functions for the operation of the motor vehicle K provided by the consumers V1, V2, V1' would no longer be available.

This state may also be avoided by the disconnecting device and the described regulation.

In the event of a fault, the maximum available and permissible current is thus regulated by the inductive component SBE. The coupled voltage regulation may ensure that the minimum permissible voltage at the safety-relevant consumers V2, V2' is not dropped below and the switching limits of the switching element TE are not exceeded. In the event of a fault with the first consumer V1, the fuse SNG may thereby be tripped as quickly as possible and the energy supply in the first subsystem BN1 may continue to be maintained.

By virtue of using the inductive component SBE and the corresponding current regulation, power loss of the disconnecting device is possible, in particular including during continuous operation, without further complex measures, such as thermal monitoring.

As described with reference to the figures, the availability of the energy supply system is thereby thus increased.

LIST OF REFERENCE SIGNS

BN Energy supply system
BN1, BN2 Subsystems
D Freewheeling diode
DR Regulation unit
K Motor vehicle
KNV Power converter
Q1, Q2 Energy sources
R Regulator
S Sensor device
SBE Inductive component
SNG, SNG' Fuses
T Disconnecting device
TE Switching element
V1, V1', V2, V2' Consumers
W Series resistor

The invention claimed is:

1. A disconnecting device for an energy supply system of a motor vehicle, wherein the energy supply system has a first subsystem and a second subsystem, the disconnecting device comprising:
a switching element that is configured to couple the first subsystem to the second subsystem in a switchable manner;
a regulation unit that is configured to regulate at least one state variable of the energy supply system by driving the switching element;
an inductive component that is arranged between the switching element and one of the subsystems; and
a freewheeling component that is arranged in parallel with the inductive component, wherein the freewheeling component comprises a freewheeling diode that is arranged in series with a resistor,
wherein the regulation unit is configured to generate a control signal for driving the switching element in a faulty operating state of the first subsystem by pulse width modulation or to modulate the switching element by pulse width modulation in order to regulate the at least one state variable, such that the switching element is repeatedly opened and closed during the faulty operating state in order to regulate the at least one state variable.

2. The disconnecting device according to claim 1, wherein the regulation unit is configured to drive the switching element during a fault-free operating state of the energy supply system such that the switching element is permanently closed.

3. The disconnecting device according to claim 1, wherein the at least one state variable comprises a voltage that is present at a second consumer of the second subsystem.

4. The disconnecting device according to claim 3, wherein a regulation target value for the voltage or a regulation limit value for the voltage is greater than or equal to a predefined minimum voltage for the second consumer.

5. The disconnecting device according to claim 1, wherein the at least one state variable comprises an electric current strength of a transfer current from the second subsystem to the first subsystem.

6. The disconnecting device according to claim 5, wherein a regulation target value for the electric current strength or a regulation limit value for the electric current strength is less than or equal to a predefined maximum switchable current strength of the switching element.

7. An energy supply system for a motor vehicle, the energy supply system comprising:
   a first subsystem comprising a first consumer, a first energy source for supplying energy to the first consumer and a fuse device that couples the first consumer to the first energy source;
   a second subsystem comprising a second consumer and a second energy source for supplying energy to the second consumer; and
   a disconnecting device according to claim 1,
   wherein the first subsystem is coupled to the second subsystem in a switchable manner by the disconnecting element.

8. The energy supply system according to claim 7, wherein the fuse device is a safety fuse.

9. The energy supply system according to claim 7, wherein:
   the first energy source comprises an electrical generator; and/or
   the first energy source comprises a first electrical energy storage unit; and/or
   the first energy source comprises a power converter, and/or
   the second energy source comprises a second electrical energy storage unit.

10. The energy supply system according to claim 9, wherein the power converter is a rectifier.

11. The energy supply system according to claim 7, wherein:
   the first subsystem comprises at least one further first consumer that is arranged in parallel with the first consumer; and/or
   the second subsystem comprises at least one further second consumer that is arranged in parallel with the second consumer.

12. The energy supply system according to claim 7, wherein:
   the first consumer is configured in accordance with a first ASIL classification level and the second consumer is configured in accordance with a second ASIL classification level, wherein the second ASIL classification level is higher than the first ASIL classification level; and/or
   the first consumer is configured in accordance with an ASIL classification level QM and the second consumer is configured in accordance with an ASIL classification level ASIL-B or higher.

13. A method for operating an energy supply system for a motor vehicle, wherein the energy supply system has a first subsystem and a second subsystem that is coupled to the first subsystem in a switchable manner by a switching element, the method comprising:
   regulating at least one state variable of the energy supply system by driving the switching element;
   limiting, by an inductive component that is arranged between the switching element and one of the subsystems, a flow of energy between the first subsystem and the second subsystem in a faulty operating state; and
   limiting, by a freewheeling component that is arranged in parallel with the inductive component, a voltage that is dropped across the inductive component during switching of the inductive component,
   wherein the freewheeling component comprises a freewheeling diode that is arranged in series with a resistor, and
   wherein driving the switching element comprises generating a control signal for driving the switching element in a faulty operating state of the first subsystem by pulse width modulation or modulating the switching element by pulse width modulation in order to regulate the at least one state variable, such that the switching element is repeatedly opened and closed during the faulty operating state in order to regulate the at least one state variable.

* * * * *